(12) United States Patent
Balasubramanian et al.

(10) Patent No.: US 9,699,201 B2
(45) Date of Patent: Jul. 4, 2017

(54) AUTOMATED RESPONSE TO DETECTION OF THREAT TO CLOUD VIRTUAL MACHINE

(71) Applicant: International Business Machines Corporation, Armonk, NY (US)

(72) Inventors: Swaminathan Balasubramanian, Southfield, MI (US); Matthew M. Lobbes, Northlake, TX (US); Brian M. O'Connell, Cary, NC (US); Brian J. Snitzer, Lancaster, PA (US)

(73) Assignee: International Business Machines Corporation, Armonk, NY (US)

( * ) Notice: Subject to any disclaimer, the term of this patent is extended or adjusted under 35 U.S.C. 154(b) by 51 days.

(21) Appl. No.: 14/495,973

(22) Filed: Sep. 25, 2014

(65) Prior Publication Data
US 2016/0094568 A1    Mar. 31, 2016

(51) Int. Cl.
*G06F 21/12* (2013.01)
*H04L 29/06* (2006.01)
(Continued)

(52) U.S. Cl.
CPC ...... *H04L 63/1416* (2013.01); *G06F 9/45558* (2013.01); *G06F 21/554* (2013.01);
(Continued)

(58) Field of Classification Search
None
See application file for complete search history.

(56) References Cited

U.S. PATENT DOCUMENTS

| | | |
|---|---|---|
| 8,010,993 B1 | 8/2011 | Bartholomay et al. |
| 8,127,412 B2 | 3/2012 | Gleichauf et al. |
| | (Continued) | |

FOREIGN PATENT DOCUMENTS

| | | |
|---|---|---|
| FR | 2974965 A1 | 11/2012 |
| JP | 2010211339 A | 9/2010 |

OTHER PUBLICATIONS

Garfinkel et al. "A Virtual Machine Introspection Based Architecture for Intrusion Detection." Network and Distributed System Security Symposium. Feb. 2003.*

(Continued)

*Primary Examiner* — Chameli Das
*Assistant Examiner* — Joanne Macasiano
(74) *Attorney, Agent, or Firm* — William H. Hartwell; Hunter E. Webb; Keohane & D'Alessandro PLLC

(57) ABSTRACT

An approach for responding to a threat in a networked computing environment (e.g., a cloud computing environment) is provided. In an embodiment, a set of associations to a virtual machine (VM) instance are established, each association indicating a relationship between the VM instance and a related VM instance. Each of the associations in the set of associations is assigned a strength attribute. When a threat is detected in a VM instance, a first preventative measure is performed on a first related VM instance, the strength of which is determined based on the strength attribute that corresponds to the association between the VM instance and the first related VM instance. A second preventative measure is performed on a second related VM instance, the strength of which is based on the strength attribute that corresponds to the association between the VM instance and the second related VM instance.

20 Claims, 11 Drawing Sheets

(51) Int. Cl.
  *G06F 9/455*  (2006.01)
  *G06F 21/55*  (2013.01)
  *G06F 21/57*  (2013.01)
  *H04L 29/08*  (2006.01)

(52) U.S. Cl.
  CPC ........ *G06F 21/577* (2013.01); *H04L 63/1458* (2013.01); *G06F 2009/45587* (2013.01); *G06F 2009/45595* (2013.01); *H04L 67/10* (2013.01); *H04L 67/14* (2013.01)

(56) References Cited

U.S. PATENT DOCUMENTS

| | | |
|---|---|---|
| 2005/0257269 A1 | 11/2005 | Chari et al. |
| 2007/0199070 A1 | 8/2007 | Hughes |
| 2007/0294391 A1 | 12/2007 | Kohn |
| 2008/0016569 A1* | 1/2008 | Hammer ............... G06F 21/554 726/23 |
| 2008/0235769 A1 | 9/2008 | Purcell et al. |
| 2009/0241192 A1 | 9/2009 | Thomas |
| 2010/0332889 A1* | 12/2010 | Shneorson ............. G06Q 10/06 714/2 |
| 2011/0047167 A1* | 2/2011 | Caceres ................. G06Q 10/10 707/749 |
| 2011/0138469 A1 | 6/2011 | Ye et al. |
| 2011/0239303 A1 | 9/2011 | Owens, Jr. |
| 2013/0055398 A1 | 2/2013 | Li et al. |
| 2013/0074143 A1 | 3/2013 | Bu et al. |
| 2013/0111540 A1 | 5/2013 | Sabin |
| 2014/0189868 A1 | 7/2014 | Laniepce et al. |
| 2014/0223556 A1 | 8/2014 | Bignon et al. |
| 2014/0351934 A1* | 11/2014 | Mitra ................... G06F 21/567 726/23 |

OTHER PUBLICATIONS

Laureano et al. "Intrusion detection in virtual machine environments." Euromicro Conference. Proceedings. 30th. IEEE, Sep. 3, 2004.*

Fangfei Zhou, et al., "Scheduler Vulnerabilities and Coordinated Attacks in Cloud Computing", Network Computing and Applications (NCA), 2011 10th IEEE International Symposium on. IEEE, 2011.

Maitland, J., "Keeping Control Isn't Easy", Chapter 4: Cloud-Based Infrastructure, SearchCloudComputing.com, 13 pages, Oct. 2009.

Mell et al., "The NIST Definition of Cloud Computing", National Institute of Standards and Technology, Information Technology Laboratory, Version 15, Oct. 7, 2009, 2 pages.

Miyaji, Takayoshi, "PCT Notification of the International Search Report and the Written Opinion of the International Searching Authority, or the Declaration", Date of Mailing Dec. 15, 2015, 3 pages.

Maitland, J., "Keeping Control Isn't Easy", Chapter 4: Cloud-Based Infrastructure, SearchCloudComputing.com, Publication Date: Oct. 2009, 17 pages.

* cited by examiner

| STRENGTH ATTRIBUTE → LOCATION OF ASSOCIATED VM INSTANCE ↓ | HIGH | MEDIUM | LOW |
|---|---|---|---|
| CO-TENANTED ON THE SAME PHYSICAL SERVER | -OWNED BY THE SAME CUSTOMER -SEPARATE BUT RELATED TO THE SAME CUSTOMER | -RELATED TO THE SAME INDUSTRY OR PROCESS -RELATED TO THE SAME TECHNOLOGY UNDERPINNINGS | -RELATED TO THE SAME TYPE OF SERVICE OR APPLICATION |
| CO-TENANTED ON THE SAME CLOUD PROVIDER | OWNED BY THE SAME CUSTOMER | -SEPARATE BUT RELATED TO THE SAME CUSTOMER -RELATED TO THE SAME TECHNOLOGY UNDERPINNINGS | -RELATED TO THE SAME INDUSTRY OR PROCESS -RELATED TO THE SAME TYPE OF SERVICE OR APPLICATION |
| LOCATED WITHIN A DIFFERENT CLOUD PROVIDER | | -OWNED BY THE SAME CUSTOMER -SEPARATE BUT RELATED TO THE SAME CUSTOMER | -RELATED TO THE SAME TECHNOLOGY UNDERPINNINGS -RELATED TO THE SAME INDUSTRY OR PROCESS -RELATED TO THE SAME TYPE OF SERVICE OR APPLICATION |

FIG. 7

| STRENGTH ATTRIBUTE → <br><br> LOCATION OF ASSOCIATED VM INSTANCE ↓ | HIGH | MEDIUM | LOW |
|---|---|---|---|
| CO-TENANTED ON THE SAME PHYSICAL SERVER | -FORCEFUL MIGRATION OF ANY PHYSICAL SERVER CO-TENANT VM INSTANCE TO A DIFFERENT PHYSICAL SERVER | -LOWERING THE ALLOWED MAXIMUM COMPUTATION LOAD OF THE ASSOCIATED VM INSTANCE <br> -LOWERING THE CACHE CAPACITY OF THE ASSOCIATED VM INSTANCE | -LOWERING THE ALLOWED MAXIMUM WEB TRAFFIC RATE OF THE ASSOCIATED VM INSTANCE |
| CO-TENANTED ON THE SAME CLOUD PROVIDER | -LOWERING THE ALLOWED MAXIMUM COMPUTATION LOAD OF THE ASSOCIATED VM INSTANCE <br> -LOWERING THE CACHE CAPACITY OF THE ASSOCIATED VM INSTANCE | -LOWERING THE ALLOWED MAXIMUM WEB TRAFFIC RATE OF THE ASSOCIATED VM INSTANCE | |
| LOCATED WITHIN A DIFFERENT CLOUD PROVIDER | -LOWERING THE ALLOWED MAXIMUM COMPUTATION LOAD OF THE ASSOCIATED VM INSTANCE | -LOWERING THE ALLOWED MAXIMUM WEB TRAFFIC RATE OF THE ASSOCIATED VM INSTANCE | |

FIG. 10

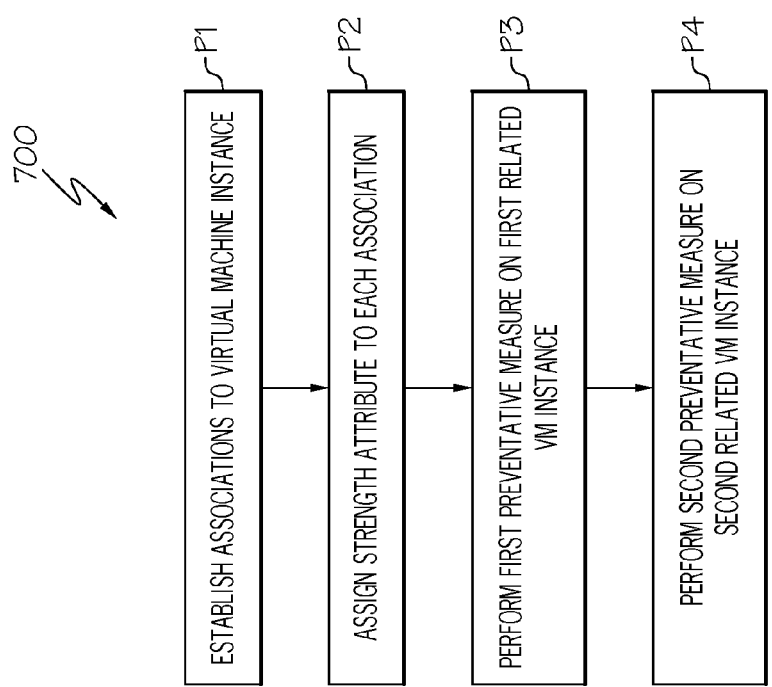

AUTOMATED RESPONSE TO DETECTION OF THREAT TO CLOUD VIRTUAL MACHINE

TECHNICAL FIELD

In general, embodiments of the present invention relate to threat management. Specifically, embodiments of the present invention relate to an approach for responding to a threat in a networked computing environment (e.g., a cloud computing environment).

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Providers in the networked computing environment often deliver common business applications (e.g., business applications having the same or substantially similar scope, function, and/or application) online, which can be accessed via a web service and/or software, such as a web browser. Individual clients can run virtual machines (VMs) that utilize these common business applications and store the data in the networked computing environment. However, these VMs can sometimes be subject to attacks. These attacks can take the form of a denial of service attack, in which resources of the VM are overloaded to prevent the VM from performing its function, a vulnerability in the underlying technology of the VM that allows someone unauthorized access to the VM, a brute-force hack into the VM by a hacker, and/or the like.

SUMMARY

In general, an approach for responding to a threat in a networked computing environment (e.g., a cloud computing environment) is provided. In an embodiment, a set of associations to a virtual machine (VM) instance are established. Each association of the set of associations indicates a relationship between the VM instance and a related VM instance. Each of the associations in the set of associations is assigned a strength attribute. When a threat is detected in a VM instance, a first preventative measure is performed on a first related VM instance. The strength of this first preventative measure is determined based on the strength attribute that corresponds to the association between the VM instance and the first related VM instance. Similarly, the detection of the threat in the VM instance causes a second preventative measure to be performed on a second related VM instance, the strength of which is based on the strength attribute that corresponds to the association between the VM instance and the second related VM instance.

A first aspect of the present invention provides a method for responding to a threat in a networked computing environment, the method comprising the computer-implemented processes of: establishing a set of associations to a virtual machine (VM) instance, each association of the set of associations indicating a relationship between the VM instance and a related VM instance; assigning a strength attribute to each association in the set of associations; performing, in response to a detection of a threat, a first preventative measure on a first related VM instance, a strength of the first preventative measure being based on the strength attribute that corresponds to the association between the VM instance and the first related VM instance; and performing, in response to the detection of the threat, a second preventative measure on a second related VM instance, a strength of the second preventative measure being based on the strength attribute that corresponds to the association between the VM instance and the second related VM instance.

A second aspect of the present invention provides a system for responding to a threat in a networked computing environment, comprising: a memory medium comprising instructions; a bus coupled to the memory medium; and a processor coupled to the bus that when executing the instructions causes the system to: establish a set of associations to a virtual machine (VM) instance, each association of the set of associations indicating a relationship between the VM instance and a related VM instance; assign a strength attribute to each association in the set of associations; perform, in response to a detection of a threat, a first preventative measure on a first related VM instance, a strength of the first preventative measure being based on the strength attribute that corresponds to the association between the VM instance and the first related VM instance; and perform, in response to the detection of the threat, a second preventative measure on a second related VM instance, a strength of the second preventative measure being based on the strength attribute that corresponds to the association between the VM instance and the second related VM instance.

A third aspect of the present invention provides a computer program product for responding to a threat in a cloud computing environment, the computer program product comprising a computer readable storage media, and program instructions stored on the computer readable storage media, that cause at least one computer device to: establish a set of associations to a virtual machine (VM) instance, each association of the set of associations indicating a relationship between the VM instance and a related VM instance; assign a strength attribute to each association in the set of associations; perform, in response to a detection of a threat, a first preventative measure on a first related VM instance, a strength of the first preventative measure being based on the strength attribute that corresponds to the association between the VM instance and the first related VM instance; and perform, in response to the detection of the threat, a second preventative measure on a second related VM instance, a strength of the second preventative measure being based on the strength attribute that corresponds to the association between the VM instance and the second related VM instance.

A fourth aspect of the present invention provides a method for deploying a system for responding to a threat in a networked computing environment, comprising: providing a computer infrastructure having at least one computer device that operates to: establish a set of associations to a virtual machine (VM) instance, each association of the set of associations indicating a relationship between the VM instance and a related VM instance; assign a strength attribute to each association in the set of associations; perform, in response to a detection of a threat, a first preventative measure on a first related VM instance, a strength of the first preventative measure being based on the strength attribute that corresponds to the association between the VM instance and the first related VM instance; and perform, in response to the detection of the threat, a second preventative measure on a second related VM instance, a strength of the second preventative measure being based on the strength attribute that corresponds to the association between the VM instance and the second related VM instance.

BRIEF DESCRIPTION OF THE DRAWINGS

These and other features of this invention will be more readily understood from the following detailed description of the various aspects of the invention taken in conjunction with the accompanying drawings in which:

FIG. 7 depicts an example strength attribute matrix according to an embodiment of the present invention;

FIG. 10 depicts an example preventative measure matrix according to an embodiment of the present invention; and FIG. 11 depicts an example process flow according to an embodiment of the present invention.

Figure 1:
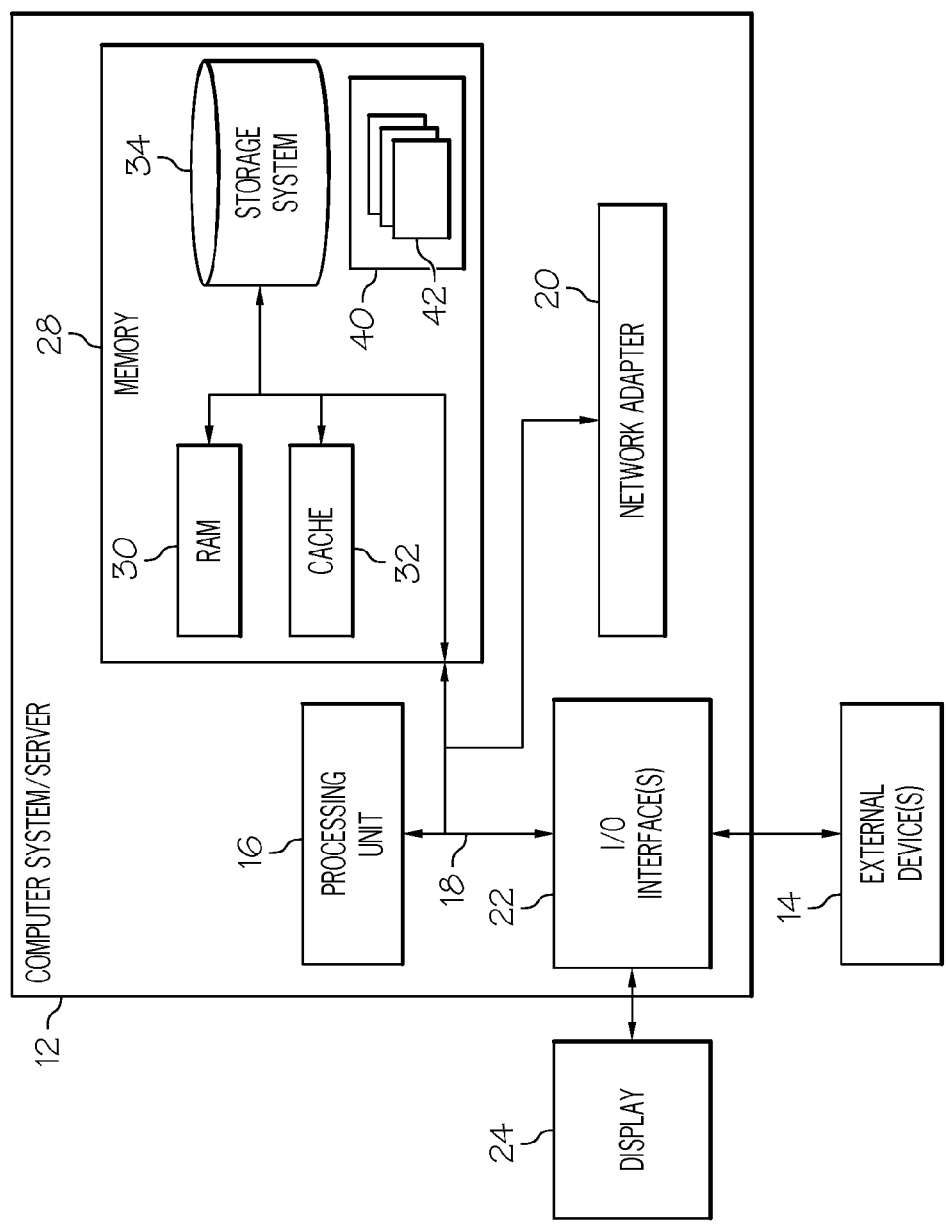
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for responding to a threat in a networked computing environment (e.g., a cloud computing environment). In an embodiment, a set of associations to a virtual machine (VM) instance are established. Each association of the set of associations indicates a relationship between the VM instance and a related VM instance. Each of the associations in the set of associations is assigned a strength attribute. When a threat is detected in a VM instance, a first preventative measure is performed on a first related VM instance. The strength of this first preventative measure is determined based on the strength attribute that corresponds to the association between the VM instance and the first related VM instance. Similarly, the detection of the threat in the VM instance causes a second preventative measure to be performed on a second related VM instance, the strength of which is based on the strength attribute that corresponds to the association between the VM instance and the second related VM instance.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows. On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
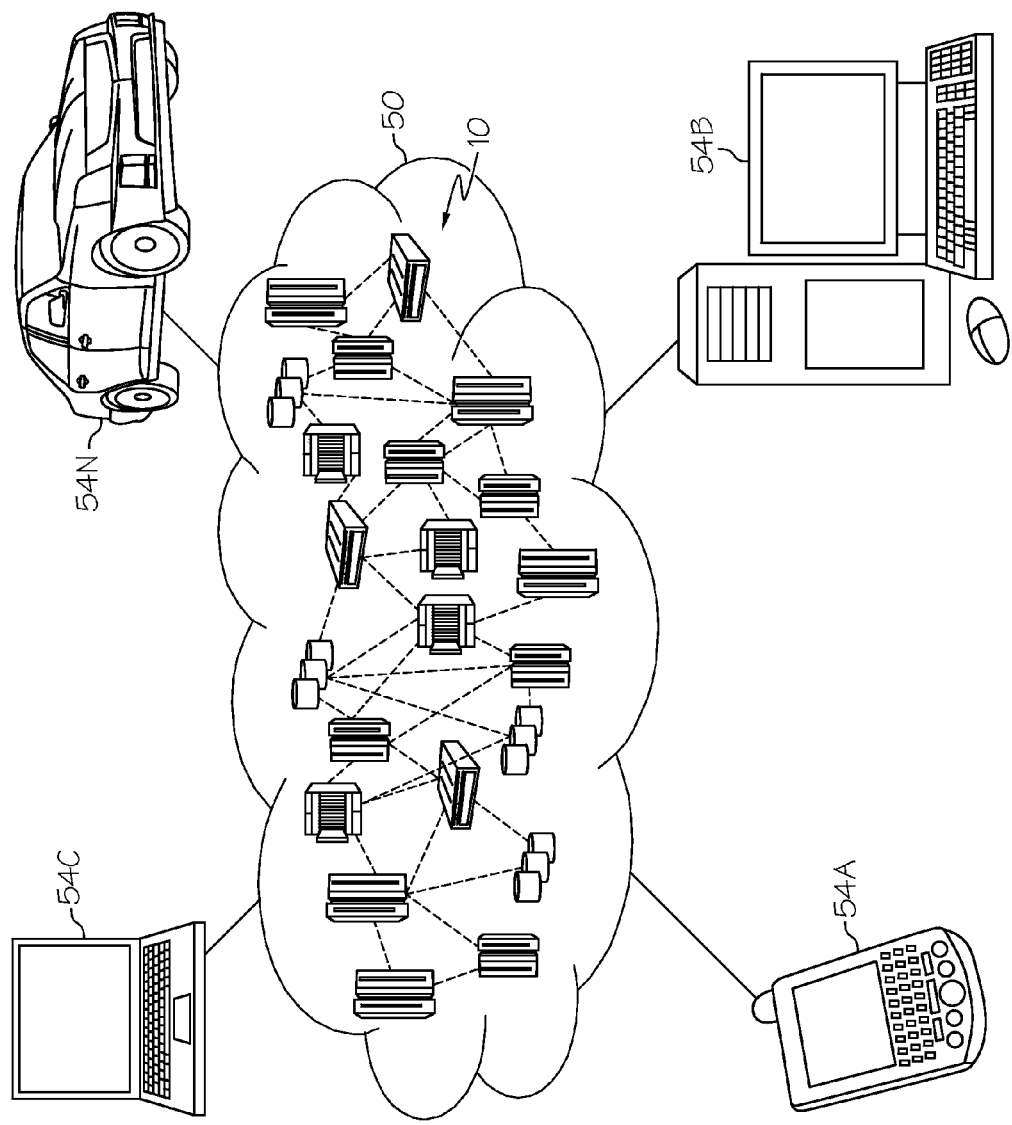
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
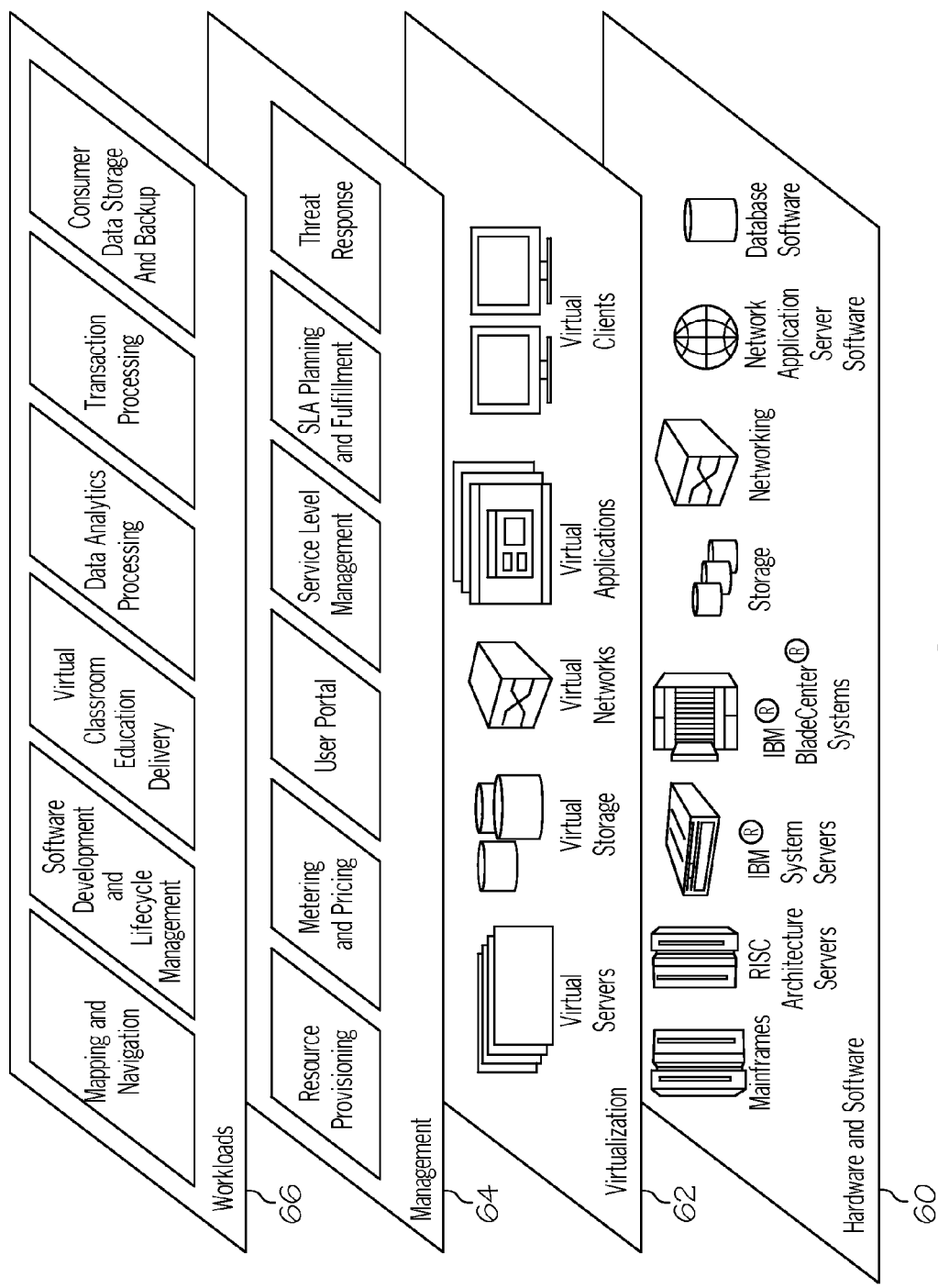
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is threat response, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the command identification functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
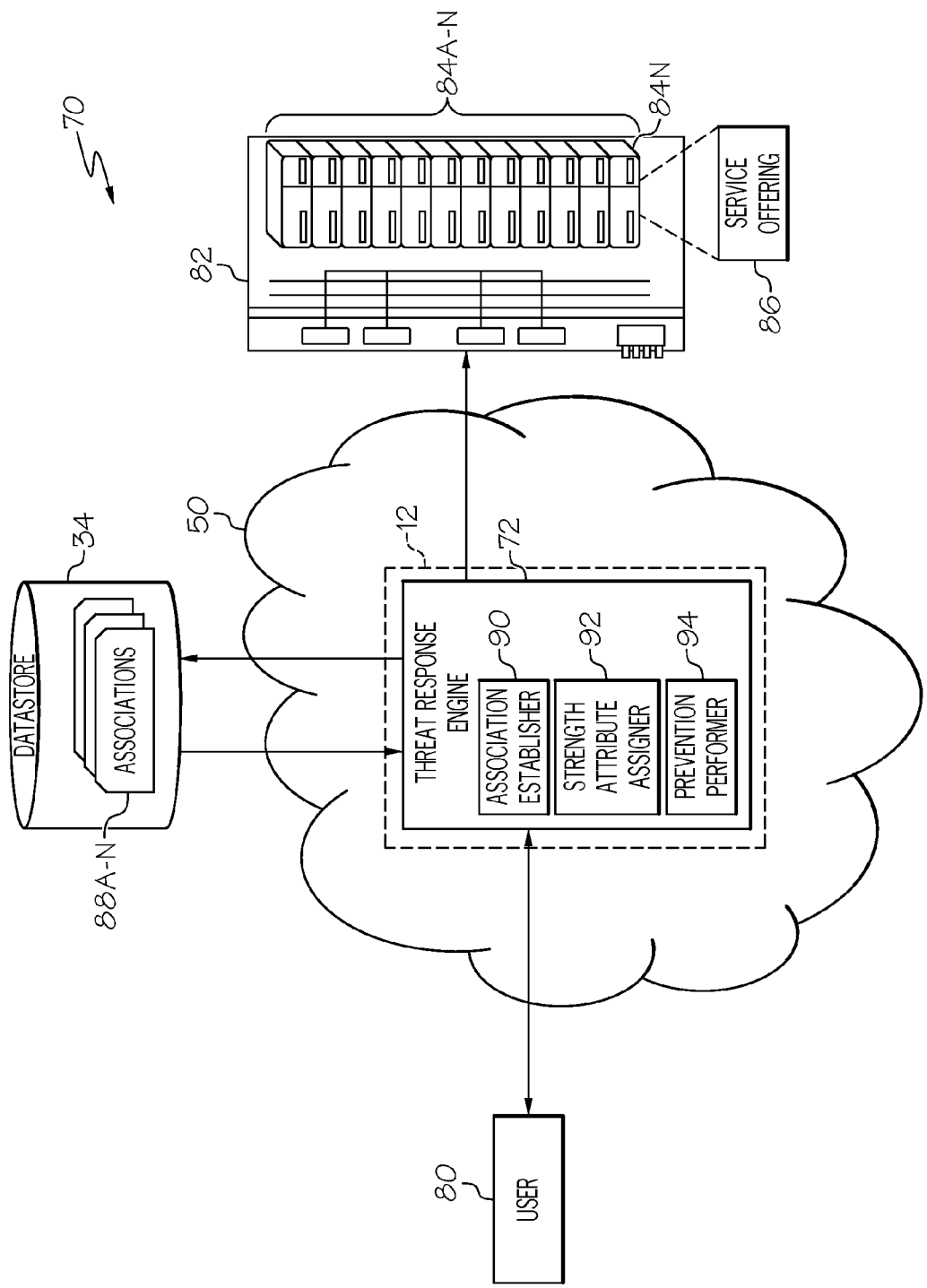
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 70 (e.g., a cloud computing environment 50). A stand-alone computer system/server 12 is shown in FIG. 4 for illustrative purposes only. In the event the teachings recited herein are practiced in a networked computing environment 70, each client need not have a threat response engine (hereinafter "system 72"). Rather, system 72 could be loaded on a server or server-capable device that communicates (e.g., wirelessly) with the clients to provide device protection therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes, and/or executes commands with respect to IT resources in a networked computing environment. Such other system(s) have not been shown in FIG. 4 for brevity purposes.

Along these lines, system 72 may perform multiple functions similar to a general-purpose computer. Specifically, among other functions, system 72 can respond to a threat in networked computing environment 70. To accomplish this, system 72 can include: an association establisher 90, a strength attribute assigner 92, and a prevention performer 94.

Figure 5:
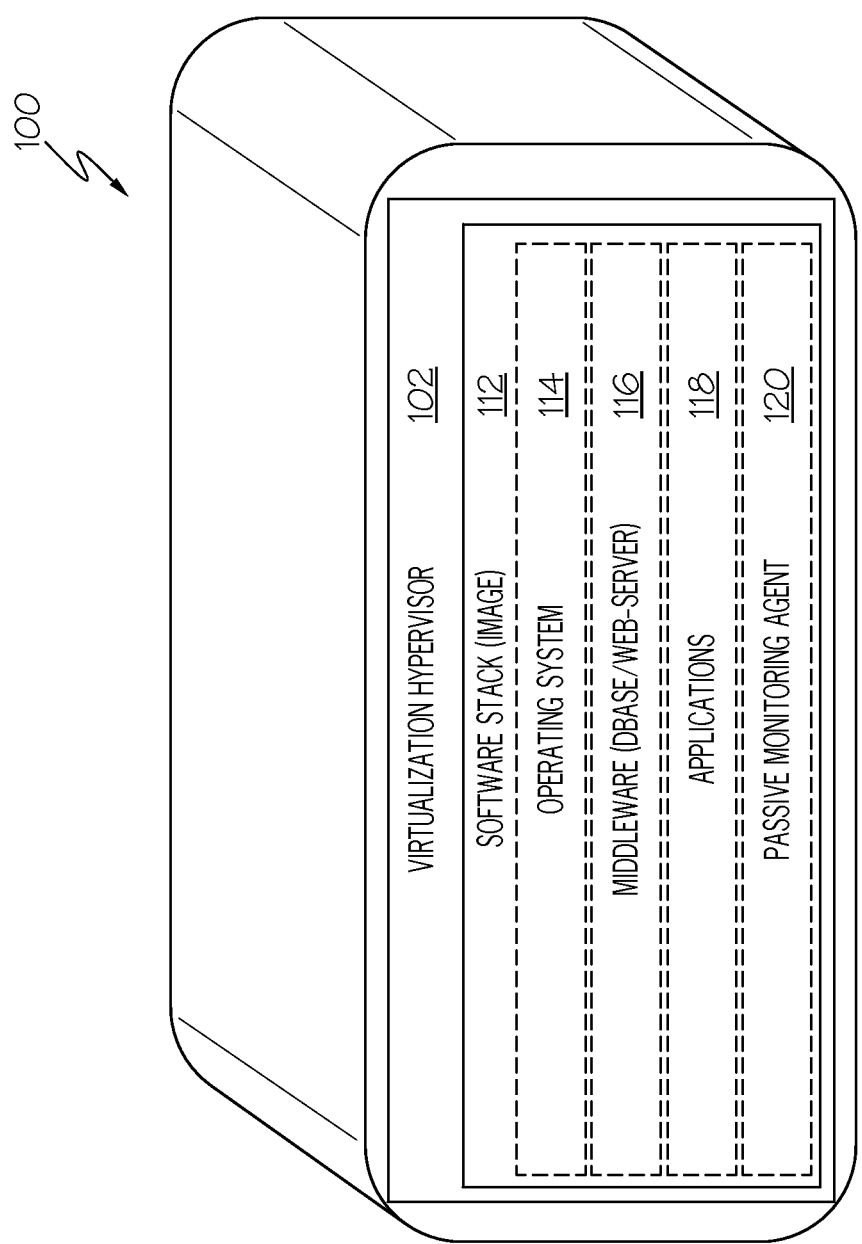
FIG. 5 depicts an example virtual machine instance according to an embodiment of the present invention.

Referring now to FIG. 5 in conjunction with FIG. 4, an example virtual machine (VM) instance 100 according to an embodiment of the invention is shown. In an embodiment, VM instance 100 can be included in virtual server 84N on physical server 82. It should be understood that VM instance 100 is different from a process virtual machine. A process virtual machine is a platform dependent engine, such as a Java® Virtual Machine, that executes platform independent code written in a high-level programming language, such as Java, for performing a specific task (Java and Java Virtual Machine are trademarks of Oracle and/or its affiliates in the United States and/or elsewhere). In contrast, the VM instance 100 of the current invention is a virtual system that simulates an entire computing environment. To this extent, rather than performing only a single task, the VM instance 100 of the current invention is an environment within which a variety of tasks, functions, operations, etc., can be carried out by a user 80, such as by executing one or more applications thereon. As such, VM instance 100 can be made to simulate a stand-alone computer system in the eyes of a user 80.

To this extent, VM instance 100 includes a virtualization hypervisor 102 at the lowest level. Specifically, virtualization hypervisor 102 provides a platform that allows multiple "guest" virtual server 84 systems to run concurrently on the physical server 82. To this extent, virtualization hypervisor 102 provides an abstraction level between the hardware level of physical server 82 and the higher level software functions of each virtual server 84. In order to provide these software functions, each virtual server 84 can include a software stack 112, which can also be referred to as an image. Software stack 112 can contain anything in service offering 86 that was initially provisioned to virtual server 84N and/or anything that has been later installed by user 80. As such, software stack 112 can contain everything that is necessary to simulate a "guest" instance of a particular virtual server 84N on physical server 82 via virtualization hypervisor 102. To this extent, software stack 112 can provide an operating system 114, middleware 116, one or more applications 118, and, optionally, passive monitoring agent 120.

As stated above, occasionally, a VM instance 100 can be subject to an attack. This attack can take the form of a denial of service attack, in which resources of VM instance 100 are overloaded to prevent VM instance 100 from performing its function, a vulnerability (e.g., a hole) in the underlying technology of VM instance 100 that allows someone unauthorized access to VM instance 100, a brute-force hack into VM instance 100 by a hacker, and/or the like.

The inventors of the invention described herein have discovered certain deficiencies in the current solutions for responding to a threat in a networked computing environment. For example, even though VM instances 100 may be subject to the same kinds of threats of attack, compromise, and/or degradation that individual systems have faced in the past, it can be difficult to understand or respond to such threats holistically when they occur in a networked computing environment. Clients may observe threats against an individual VM instance 100, but it can be hard to both distinguish and respond to threats that may potentially impact many different VM instances 100 simultaneously. Presently, the only known solutions are manual firewall policy changes based on reactions to detected security violations or threats. However, these policy changes, if applied too broadly, can affect the performance of VM instances 100 that may have little or no risk from the threat. Conversely, attempting to manually configure a policy change that is tailored to specific VM instances 100 that may be impacted by a specific threat can consume a large amount of time and resources and may be prone to errors and/or omissions.

Referring again to FIG. 4, association establisher 90 of system 72, as executed by computer system/server 12, is configured to establish a set of associations to a VM instance 100. Each association that is established by association establisher 90 indicates a relationship between the VM instance and a related VM instance. Association establisher 90 can establish these associations prior to the detection of a threat, in which case the associations can be stored in a database (e.g., datastore 34). Additionally or in the alternative, association establisher 90 can dynamically establish the associations in response to the detection of a threat in a particular VM instance.

Figure 6:
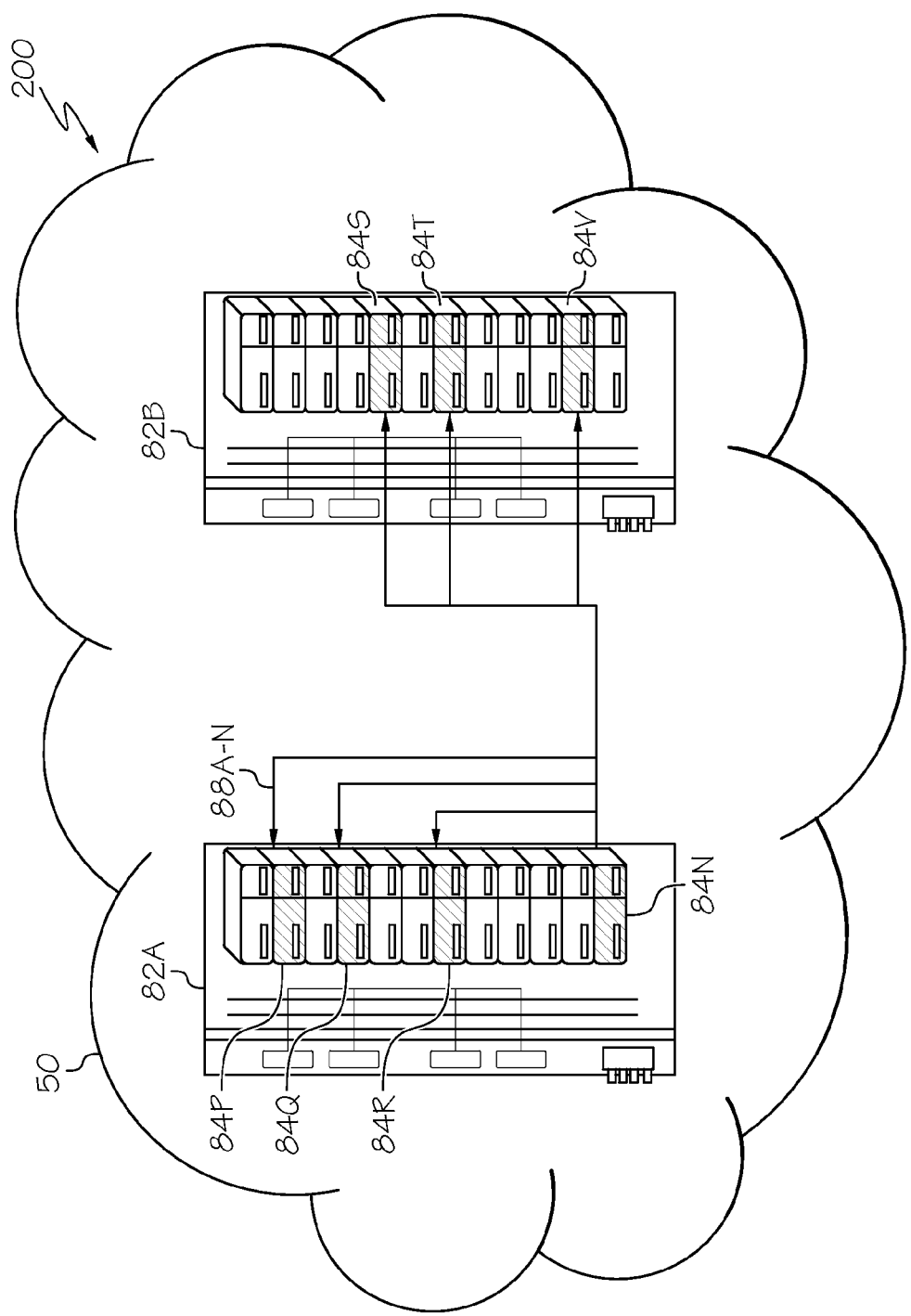
FIG. 6 depicts an example networked computing environment according to an embodiment of the present invention.

Referring now to FIG. 6, a networked computing environment 200 according to embodiments of the present invention is shown. As shown, networked computing environment 200 includes a cloud computing environment 50 that includes a set of physical servers 82A, 82B. Physical server 82A is illustrated as including a VM instance 84N, which has associations 88A-N established with a number of related VM instances 84P, 84Q, 84R, 84S, 84T, and 84V. These associations 88A-N can be established with VM instances (e.g., related VM instances 84P, 84Q, 84R) that are located on the same physical server 82A, between VM instances (e.g., related VM instances 84S, 84T, 84V) located on a different physical server 82B in a common cloud computing environment 50 (e.g., having the same cloud computing environment in common), and/or between VM instances located on different networked computing environments (not shown). However, it should be clear that not all VM instances must have an association 88A-N with a particular VM instance 84N. Rather, as illustrated, those related VM instances 84P, 84Q, 84R, 84S, 84T, and 84V having an association 88A-N with VM instance 84N are illustrated with a dashed pattern while those which do not have an association 88A-N with VM instance 84N have no pattern.

In any case, associations 88A-N between VM instance 84N and related VM instances 84P, 84Q, 84R, 84S, 84T, and 84V can be based on one or more relationship factors. For example, an association 88A-N can be formed based on related VM instance 84P, 84Q, 84R, 84S, 84T, and 84V being owned by a common customer (e.g., the same customer) with VM instance 84N. This association 88A-N can capture the relationship to cloud VM instances that are owned by the same customer. For example, it can be common for customers to use one cloud instance to perform one function (e.g., to run their human resources processing) and one or more other instances to perform other functions (e.g., operate their core businesses).

Additionally or in the alternative, the association 88A-N can be formed based on related VM instance 84P, 84Q, 84R, 84S, 84T, and 84V being owned by a customer that is related to the owner of VM instance 84N. This association 88A-N can capture, for example, relationships in which the related cloud VM instance 84P, 84Q, 84R, 84S, 84T, and 84V either consumes or provides services to the customer of VM instance 84N. While this VM may be managed by a separate second customer, this type of related VM instance 84P, 84Q, 84R, 84S, 84T, and 84V can be important to the customer from their business operations perspective. Additionally or in the alternative, the association 88A-N can be formed based on related VM instance 84P, 84Q, 84R, 84S, 84T, and 84V performing a service and/or having an application that is in common with (e.g., the same or substantially similar to) that of VM instance 84N. These related VM instances 84P, 84Q, 84R, 84S, 84T, and 84V can be similar from a user flow standpoint, and may share some backend functions. For example, a cloud application to process hotel reservations and another to process movie reservations may fall within this category.

Additionally or in the alternative, the association 88A-N can be formed based on related VM instance 84P, 84Q, 84R, 84S, 84T, and 84V being related to an industry and/or process that is in common with (e.g., the same or substantially similar to) that of VM instance 84N. Related VM instances 84P, 84Q, 84R, 84S, 84T, and 84V that belong to the same industry or fall under the same business process (e.g., when using a common/similar process framework such as APQC's PCF) as VM instance 84N may belong to this type. For example, VM applications that process airline reservations, even though different processes may be utilized, are an example of this type. Additionally or in the alternative, the association 88A-N can be formed based on related VM instance 84P, 84Q, 84R, 84S, 84T, and 84V being related to technology underpinnings that are in common with (e.g., the same or substantially similar to) that of VM instance 84N. This type of association 88A-N can be based on the underlying technologies used by the VM instances. For example, VM instances that use WebSphere as the underlying J2EE runtime platform may belong to this type. Additionally or in the alternative, the association 88A-N can be formed based on any other relationship between related VM instance 84P, 84Q, 84R, 84S, 84T, and 84V and VM instance 84N that is now known or later developed.

Referring again to FIG. 4, strength attribute assigner 92 of system 72, as executed by computer system/server 12, is configured to assign a strength attribute to each association in the set of associations. This strength attribute indicates how strong the association 88A-N is between VM instance 84N and each of related VM instances 84P, 84Q, 84R, 84S, 84T, and 84V. To this extent, the strength attribute for each of related VM instances 84P, 84Q, 84R, 84S, 84T, and 84V can be drawn from a set of discrete strength attributes. For example, in an embodiment, strength attributes of "high", "medium", or "low" can be assigned to each association. Alternatively, numerical values, alphanumerical values, or any other values now known or later developed for designating ranking strength can be used. Whatever type of strength attribute is used, in embodiments in which associations 88A-N are pre-determined, the strength attribute can be stored in the database (e.g., datastore 34) with the corresponding association 88A-N. For example, an entry in database may contain the VM instance 84N, a strength attribute (e.g., "high"), and one or more related VM instances (e.g., related VM instance 84Q).

Referring now to FIG. 7 in conjunction with FIG. 6, a example matrix 300 for assigning strength attributes to associations 88A-N is shown according to embodiments of the present invention. As illustrated, matrix 300 includes a set of strength attributes 302, which can be assigned to each of the associations 88A-N. Which strength attribute 302 is assigned to a particular association 88A-N is determined based on which of the relationship factors 306 the association 88A-N is based on. Additionally, the strength attribute 302 that is assigned to the association 88A-N can further be based on a location 304 of the related VM instance 84P, 84Q, 84R, 84S, 84T, and 84V with respect to the VM instance 84N. For example, based on table 300, an association 88A-N that is based on the relationship factor 306 of being owned by the same customer would have a strength attribute 302 of "high" for location 304 that includes both co-tenanted on the same physical server and co-tenanted on the same cloud provider and a strength attribute 302 of "medium" for location 304 located within a different cloud provider. Conversely, an association 88A-N that is based on the relationship factor 306 of being related to the same type of service or application has a strength attribute 302 of "low" for all locations 304.

Figure 8:
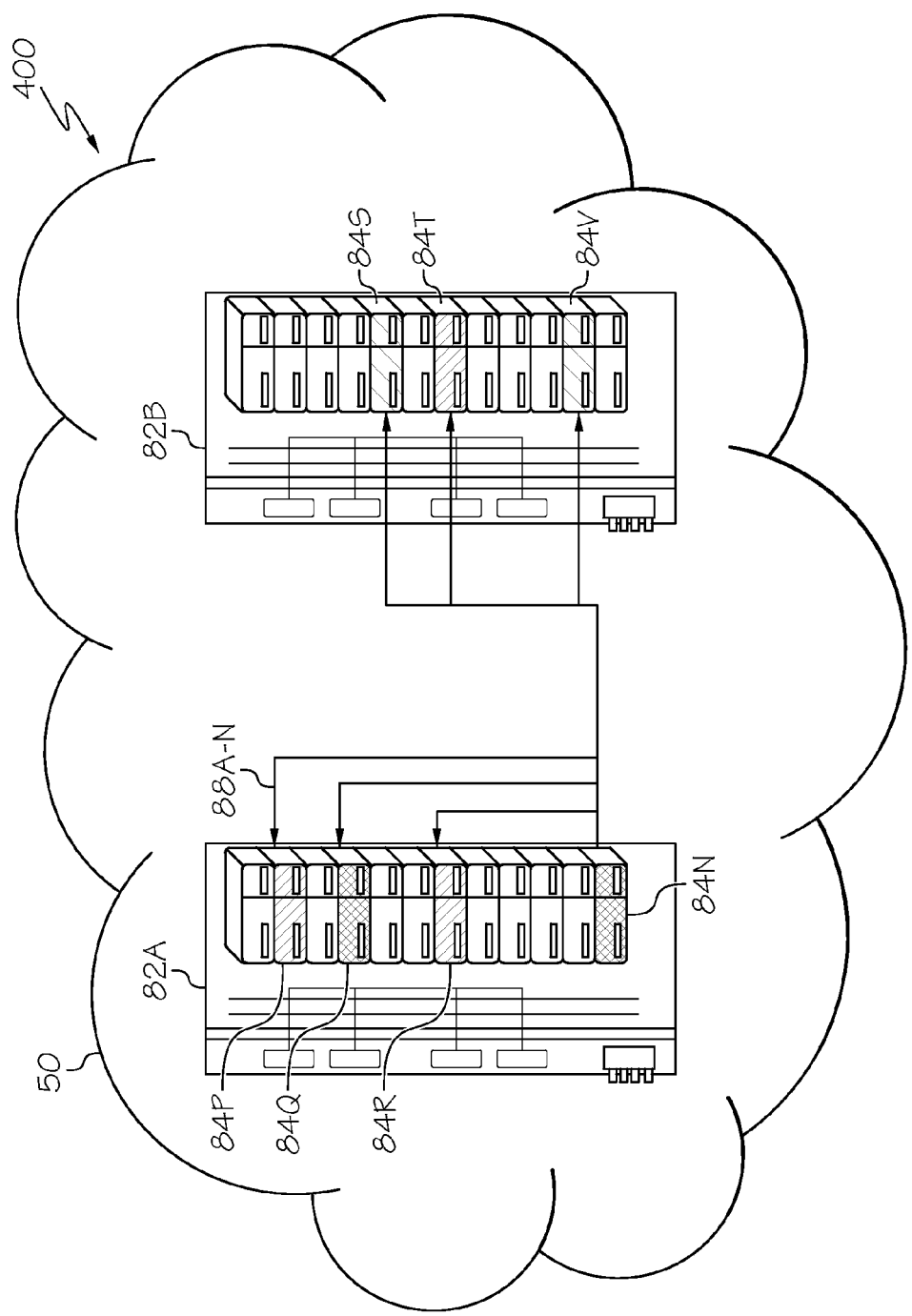
FIG. 8 depicts an example networked computing environment according to an embodiment of the present invention.

Referring now to FIG. 8 in conjunction with FIG. 7, a networked computing environment 400 according to embodiments of the present invention is shown. As shown, VM instance 84N has associations 88A-N with each of each of related VM instances 84P, 84Q, 84R, 84S, 84T, and 84V. However, in contrast to the associations 88A-N of FIG. 6, each related VM instance 84P, 84Q, 84R, 84S, 84T, and 84V is shown with a pattern that corresponds to the strength attribute 302 that is assigned to the association 88A-N between the VM instances. For example, related VM instance 84Q has a dark solid line pattern, indicating a strength attribute 302 of "high". Similarly, related VM instances 84P, 84R, and 84T have a light solid line pattern, indicating a strength attribute 302 of "medium". Further, related VM instances 84S and 84V have a light dashed line pattern, indicating a strength attribute 302 of "low". Note that not all related VMs 84P, 84Q, 84R, 84S, 84T, and 84V on the same physical server 82A, 82B, necessarily have the same strength attribute 302.

Referring again to FIG. 4, prevention performer 94 of system 72, as executed by computer system/server 12, is configured to perform, in response to a detection of a threat, a preventative measure on a related VM instance 84P, 84Q, 84R, 84S, 84T, and 84V (FIG. 8). This threat can include a denial of service attack, in which resources of the VM are overloaded to prevent the VM from performing its function, a vulnerability (e.g., a hole) in the underlying technology of the VM that allows someone unauthorized access to the VM, a brute-force hack into the VM by a hacker, and/or any other type of threat now known or later discovered. Further, the threat can be discovered in any manner now known nor later developed. For example, the threat can be detected by a threat detection tool (e.g., passive monitoring agent 120 (FIG. 5)) that executes on the networked computing environment 70. To this extent, the threat detection tool can be included in the VM instance itself, can be located in a separate VM instance on the same physical server, or can be located on a physical server that is remote from the physical server. Further, the threat detection tool can operate by actively monitoring the operations of the VM instance or, alternatively, can take periodic snapshots of the VM instance to determine the existence of a threat.

In any case, when a threat to a cloud VM instance is detected, or the cloud VM instance itself is threatening the rest of the cloud, the system 72 can be invoked automatically. System 72 can receive specific threat information including but not limited to some or all of the following—
1. Attacked Cloud VM instance;
2. Location information associated with the VM instance;
3. List of associated VM instances; and/or
4. Association Strength Matrix of the attacked VM instance.

This specific threat information can be used by prevention performer 94 to perform the preventative measure of a particular VM instance that has a strength, which depends on the strength attribute 302 (FIG. 7) that corresponds to the association 88A-N (FIG. 6) between the VM instance 84N and the related VM instance.

Figure 9:
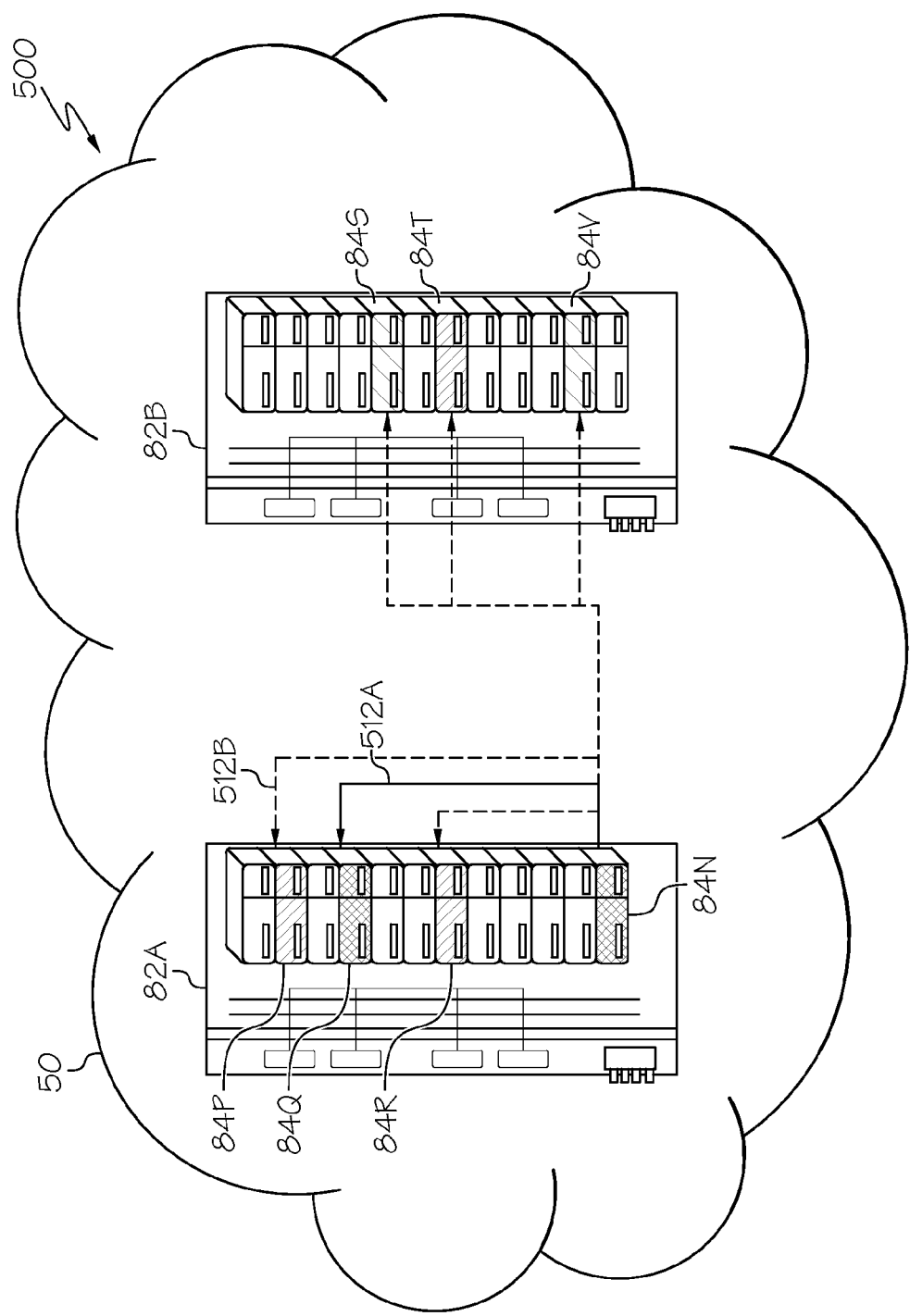
FIG. 9 depicts an example networked computing environment according to an embodiment of the present invention.

Referring now to FIG. 9, a networked computing environment 500 according to embodiments of the present invention is shown. As illustrated, a first preventative measure 512A is performed on 84Q. First preventative measure 512A has a strength that is tailored to the fact that the strength attribute 302 (FIG. 7) that corresponds to the association 88A-N (FIG. 6) between VM instance 84N and related VM instance 84Q is "high". To this extent, preventative measure 512A performed on related VM instance 84Q is relatively strong. This strong preventative measure 512A reflects that the high level of relationship (as reflected by the strength attribute 302 (FIG. 7) of "high" assigned to the association 88A-N (FIG. 6) between VM instance 84N and related VM instance 84Q) increases the probability that the same threat detected in VM instance 84N may later occur in related VM instance 84Q. To this extent, the term "strength", as used to describe the preventative measures herein, describes the aggressiveness of the preventative measure (e.g., to what extent the measure is being proactive in preventing a potential future threat).

Turning again to FIG. 4 in conjunction with FIG. 8, prevention performer 94 of system 72, as executed by computer system/server 12 is configured to perform, in response to the detection of the threat, a different preventative measure 512B on another related VM instance 84P. As with preventative measure 512A, the strength of the second preventative measure 512B is also based on the strength attribute 302 (FIG. 7) that corresponds to the association 88A-N (FIG. 6) between VM instance 84N and the second related VM instance 84P. The second preventative measure 512B that is performed on 84P has a strength that is tailored to the fact that the strength attribute 302 (FIG. 7) that corresponds to the association 88A-N (FIG. 6) between VM instance 84N and related VM instance 84P is "medium". To this extent, preventative measure 512B performed on related VM instance 84P should be relatively weaker than preventative measure 512B performed on related VM instance 84Q. This relatively weaker preventative measure 512B reflects that the lower level of relationship (as reflected by the strength attribute 302 (FIG. 7) of "medium" assigned to the association 88A-N (FIG. 6) between VM instance 84N and related VM instance 84Q) decreases the probability that the same threat detected in VM instance 84N may later occur in related VM instance 84Q relative to related VM instance 84P and/or will have less of an impact. Similarly, a related VM instance 84S, 84V having an association 88A-N (FIG. 6) with a strength attribute 302 (FIG. 7) of "low" would have a remedy performed on it that has the lowest strength (or no remedy at all), reflecting the fact that the related VM instance 84S, 84V is least likely to be impacted by the threat detected on VM instance 84N.

Referring now to FIG. 10 in conjunction with FIG. 9, a example matrix 600 for determining a preventative measure 502 to be performed is shown according to embodiments of the present invention. As shown, preventative measure 502 is performed based on the strength attribute 504 that corresponds to the association. Further, preventative measure 502 can depend on the location 506 of the related VM instance 84P, 84Q, 84R, 84S, 84T, and 84V with respect to VM instance 84N. To this extent, any preventative measure 502 now known or later developed can be performed. These preventative measures 502 can include, but are not limited to, the following—
1. Lowering the allowed maximum computation load of the associated VM instance;
2. Lowering the allowed maximum web traffic rate of the associated VM instance;
3. Lowering the cache capacity of the associated VM instance; and/or
4. Forceful migration of any same physical server co-tenant VM instance to a different physical server.

Referring now to FIG. 11 in conjunction with FIG. 4, a method flow diagram according to an embodiment of the present invention is shown. At P1, association establisher 90 of system 72, as executed by computer system/server 12, establishes a set of associations 88A-N to a virtual machine (VM) instance 84N. Each association 88A-N of the set of associations 88A-N indicates a relationship between the VM instance 84N and a related VM instance 84A-N. At P2, strength attribute assigner 92 of system 72, as executed by computer system/server 12, assigns a strength attribute to each association 88A-N in the set of associations 88A-N. At P3, prevention performer 94, performs, in response to a detection of a threat, a first preventative measure on a first related VM instance. The strength of the first preventative measure being performed by prevention performer 94 on the first related VM instance is based on the strength attribute that corresponds to the association 88A-N between the VM instance 84N and the first related VM instance. At P4, prevention performer 94 of system 72, as executed by computer system/server 12, performs, in response to a detection of a threat, a second preventative measure on a second related VM instance. As with the strength of the first preventative measure, the strength of the second preventative measure is based on the strength attribute that corresponds to the association 88A-N between the VM instance and the second related VM instance.

The flow of FIG. 11 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for responding to a threat in a networked computing environment, it is understood that the invention further provides various alternative embodiments. For example, in one embodiment, the invention provides a method that performs the process of the invention on a subscription, advertising, and/or fee basis. That is, a service provider, such as a Solution Integrator, could offer to provide functionality for responding to a threat. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In another embodiment, the invention provides a computer-implemented method for responding to a threat in a networked computing environment. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

Some of the functional components described in this specification have been labeled as systems or units in order to more particularly emphasize their implementation independence. For example, a system or unit may be implemented as a hardware circuit comprising custom VLSI circuits or gate arrays, off-the-shelf semiconductors such as logic chips, transistors, or other discrete components. A system or unit may also be implemented in programmable hardware devices such as field programmable gate arrays, programmable array logic, programmable logic devices or the like. A system or unit may also be implemented in software for execution by various types of processors. A system or unit or component of executable code may, for instance, comprise one or more physical or logical blocks of computer instructions, which may, for instance, be organized as an object, procedure, or function. Nevertheless, the executables of an identified system or unit need not be physically located together, but may comprise disparate instructions stored in different locations which, when joined logically together, comprise the system or unit and achieve the stated purpose for the system or unit.

Further, a system or unit of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices and disparate memory devices.

Furthermore, systems/units may also be implemented as a combination of software and one or more hardware devices. For instance, availability detector 118 may be embodied in the combination of a software executable code stored on a memory medium (e.g., memory storage device). In a further example, a system or unit may be the combination of a processor that operates on a set of operational data.

As noted above, some of the embodiments may be embodied in hardware. The hardware may be referenced as a hardware element. In general, a hardware element may refer to any hardware structures arranged to perform certain operations. In one embodiment, for example, the hardware elements may include any analog or digital electrical or electronic elements fabricated on a substrate. The fabrication may be performed using silicon-based integrated circuit (IC) techniques, such as complementary metal oxide semiconductor (CMOS), bipolar, and bipolar CMOS (BiCMOS) techniques, for example. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor devices, chips, microchips, chip sets, and so forth. However, the embodiments are not limited in this context.

Also noted above, some embodiments may be embodied in software. The software may be referenced as a software element. In general, a software element may refer to any software structures arranged to perform certain operations. In one embodiment, for example, the software elements may include program instructions and/or data adapted for execution by a hardware element, such as a processor. Program instructions may include an organized list of commands comprising words, values, or symbols arranged in a predetermined syntax that, when executed, may cause a processor to perform a corresponding set of operations.

The present invention may also be a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

It is apparent that there has been provided approaches for responding to a threat in a networked computing environment. While the invention has been particularly shown and described in conjunction with exemplary embodiments, it will be appreciated that variations and modifications will occur to those skilled in the art. Therefore, it is to be understood that the appended claims are intended to cover all such modifications and changes that fall within the true spirit of the invention.

What is claimed is:

1. A method for responding to a threat in a networked computing environment, the method comprising the computer-implemented processes of:
    establishing a set of associations to a virtual machine (VM) instance, each association of the set of associations indicating a relationship between the VM instance and a related VM instance;
    assigning a strength attribute to each association of the set of associations, wherein a first association corresponding to a first related VM instance is assigned a first strength attribute and a second association corresponding to a second related VM instance is assigned a second strength attribute and wherein the first strength attribute is relatively higher than the second strength attribute;
    performing, in response to a detection of a threat, a first preventative measure on the first related VM instance, a strength of the first preventative measure being relatively stronger based on the first strength attribute; and
    performing, in response to the detection of the threat, a second preventative measure on the second related VM instance, a strength of the second preventative measure being relatively weaker that the first preventative measure based on the second strength attribute.

2. The method of claim 1, the method further comprising executing a threat-detection tool, wherein the threat detection tool detects the threat.

3. The method of claim 2, wherein the threat includes at least one of: a denial of service attack, a vulnerability in the VM instance, or a hack.

4. The method of claim 1, wherein the set of associations is established based on at least one of the following relationship factors: a related VM instance is owned by a common customer with the VM instance, the related VM instance is owned by a customer that is related to an owner of the VM instance, the related VM instance performs a common service as the VM instance, the related VM instance is related to a common process with the VM instance, or the related VM instance is related to common technology underpinnings with the VM instance.

5. The method of claim 1, wherein, for each association, the strength attribute is one of: high, medium, or low.

6. The method of claim 1, wherein the first preventative measure and the second preventative measure are further based on a location of the VM instance with respect to the first related VM instance and the second related VM instance, respectively.

7. The method of claim 1, wherein the networked computing environment is a cloud computing environment and wherein the VM instance, the first related VM instance, and the second related VM instance are all cloud resources.

8. A system for responding to a threat in a networked computing environment, comprising:
   a memory medium comprising instructions;
   a bus coupled to the memory medium; and
   a processor coupled to the bus that when executing the instructions causes the system to:
      establish a set of associations to a virtual machine (VM) instance, each association of the set of associations indicating a relationship between the VM instance and a related VM instance;
      assign a strength attribute to each association in the set of associations wherein a first association corresponding to a first related VM instance is assigned a first strength attribute and a second association corresponding to a second related VM instance is assigned a second strength attribute and wherein the first strength attribute is relatively higher than the second strength attribute;
      perform, in response to a detection of a threat, a first preventative measure on the first related VM instance, a strength of the first preventative measure being relatively stronger based on the first strength attribute; and
      perform, in response to the detection of the threat, a second preventative measure on the second related VM instance, a strength of the second preventative measure being relatively weaker that the first preventative measure on the second strength attribute.

9. The system of claim 8, the instructions further causing the system to execute a threat-detection tool, wherein the threat detection tool detects the threat.

10. The system of claim 9, wherein the threat includes at least one of: a denial of service attack, a vulnerability in the VM instance, or a hack.

11. The system of claim 8, wherein the set of associations is established based on at least one of the following relationship factors: a related VM instance is owned by a common customer with the VM instance, the related VM instance is owned by a customer that is related to an owner of the VM instance, the related VM instance performs a common service as the VM instance, the related VM instance is related to a common process with the VM instance, or the related VM instance is related to common technology underpinnings with the VM instance.

12. The system of claim 8, wherein, for each association, the strength attribute is one of: high, medium, or low.

13. The system of claim 8, wherein the first preventative measure and the second preventative measure are further based on a location of the VM instance with respect to the first related VM instance and the second related VM instance, respectively.

14. The system of claim 8, wherein the networked computing environment is a cloud computing environment and wherein the VM instance, the first related VM instance, and the second related VM instance are all cloud resources.

15. A computer program product for responding to a threat in a cloud computing environment, the computer program product comprising a computer readable storage device, and program instructions stored on the computer readable storage device, that cause at least one computer device to:
   establish a set of associations to a virtual machine (VM) instance, each association of the set of associations indicating a relationship between the VM instance and a related VM instance;
   assign a strength attribute to each association in the set of associations, wherein a first association corresponding to a first related VM instance is assigned a first strength attribute and a second association corresponding to a second related VM instance is assigned a second strength attribute and wherein the first strength attribute is relatively higher than the second strength attribute;
   perform, in response to a detection of a threat, a first preventative measure on the first related VM instance, a strength of the first preventative measure being relatively stronger based on the first strength attribute; and
   perform, in response to the detection of the threat, a second preventative measure on the second related VM instance, a strength of the second preventative measure being relatively weaker that the first preventative measure based on the strength attribute.

16. The computer program product of claim 15, the instructions further causing the at least one computer device to: execute a threat-detection tool, wherein the threat detection tool detects the threat.

17. The computer program product of claim 16, wherein the threat includes at least one of: a denial of service attack, a vulnerability in the VM instance, or a hack.

18. The computer program product of claim 15, wherein the set of associations is established based on at least one of the following relationship factors: a related VM instance is owned by a common customer with the VM instance, the related VM instance is owned by a customer that is related to an owner of the VM instance, the related VM instance performs a common service as the VM instance, the related VM instance is related to a common process with the VM instance, or the related VM instance is related to common technology underpinnings with the VM instance.

19. The computer program product of claim 15, wherein the first preventative measure and the second preventative measure are further based on a location of the VM instance with respect to the first related VM instance and the second related VM instance, respectively.

20. The computer program product of claim 15, wherein the networked computing environment is a cloud computing environment and wherein the VM instance, the related VM instance, and the second related VM instance are all first cloud resources.

* * * * *